United States Patent
Kelsey

(10) Patent No.: US 7,438,735 B2
(45) Date of Patent: Oct. 21, 2008

(54) FILTER APPARATUS WITH AUTOMATIC CLEANING

(75) Inventor: Jeffery P. Kelsey, Geneva, NY (US)

(73) Assignee: Eastman Kodak Company, Rochester, NY (US)

( * ) Notice: Subject to any disclaimer, the term of this patent is extended or adjusted under 35 U.S.C. 154(b) by 624 days.

(21) Appl. No.: 11/038,622

(22) Filed: Jan. 19, 2005

(65) Prior Publication Data

US 2005/0188662 A1 Sep. 1, 2005

Related U.S. Application Data

(60) Provisional application No. 60/548,544, filed on Feb. 27, 2004.

(51) Int. Cl.
*B01D 46/04* (2006.01)

(52) U.S. Cl. .............................. 55/283; 55/284; 55/302; 55/318; 55/321; 55/322; 55/287; 55/385.1; 55/467; 95/20; 95/279; 95/280

(58) Field of Classification Search .................. 55/283, 55/284, 302, 318, 321, 322, 287, 385.1, 467; 95/20, 279, 280
See application file for complete search history.

(56) References Cited

U.S. PATENT DOCUMENTS

| 4,445,912 | A | * | 5/1984 | Volk et al. | ...................... 55/283 |
| 4,778,491 | A | * | 10/1988 | Yow, Sr. | ........................ 95/26 |
| 5,152,895 | A | * | 10/1992 | Doucet | ...................... 210/636 |
| 6,458,178 | B1 | * | 10/2002 | Dietz et al. | ................... 55/302 |

* cited by examiner

*Primary Examiner*—Minh-Chau T Pham

(57) ABSTRACT

A filter apparatus includes a gas-impermeable outer conduit having an open end and a closed end. The interior of the outer conduit is axially divided into first and second sides. A first clean and first dirty flow path are defined within the first side. A first gas-permeable liner separates the first clean flow path from the first dirty flow path and from the open end. A second clean and second dirty flow path, are defined within the second side. A second gas-permeable liner separates the second clean flow path from the second dirty flow paths and from the open end. A control valve connects one of the first clean and second clean flow paths to an exhaust conduit, and connects the other clean flow path to a selectively pulsed supply of cleaning gas.

19 Claims, 5 Drawing Sheets

FILTER APPARATUS WITH AUTOMATIC CLEANING

CROSS REFERENCE TO RELATED APPLICATION

Reference is made to and priority claimed from U.S. Provisional Application Ser. No. 60/548,544, filed Feb. 27, 2004, entitled FILTER APPARATUS WITH AUTOMATIC CLEANING.

FIELD OF THE INVENTION

The present invention relates generally to the production and processing of material in the form of fine powder or granulates. More particularly, the present invention relates to a filtering apparatus with automatic cleaning for use with such materials.

BACKGROUND OF THE INVENTION

Many of the production processes used to produce fine particulate or powdered material, such as, for example, toner for use in electrophotographic printing and/or copying machines, are carried out in a controlled environment. The controlled environment typically includes a vessel or container within which the fine particulate or powdered material is contained, and within which a production process, such as, for example, sifting or milling, occurs. A flow of pressurized gas, such as, for example, air, nitrogen or other inert gas, is typically provided to the interior of the vessel or container. The flow of pressurized gas serves various purposes, including the control of dust, facilitating the movement or flow of material, reducing the entry of contaminants into the vessel or container, and reducing the possibility of explosion. An exhaust flow path is typically provided for controlled venting of the pressurized gas from the vessel. The flow of exhaust gas may be captured, used in other processes and/or recycled.

A certain amount of the particulate or powdered material is picked up by the flow of pressurized gas and carried into the exhaust flow path. Depending upon the characteristics of the particulate or powdered material, the exhaust gas flow may consist of from approximately 2 to 5 percent or higher of the particulate or powdered material. The particulate or powdered material accumulates in the exhaust flow path or portions thereof. The exhaust flow path or exhaust ducting must therefore be cleaned periodically to remove the accumulated particulate or powdered material.

One or more filters may be disposed within the exhaust flow path or exhaust ducting to remove the particulate material from the flow of exhaust gas. The fine particulate, or powdered material, is trapped by the filters; thereby making the exhaust gas, substantially cleaner and more environmentally benign. The filters, however, require a significant amount of maintenance. Preventative maintenance, such as cleaning and/or replacement of the filters, must be performed periodically. Although such periodic preventative maintenance occurs on a reasonably predictable basis, it nonetheless requires suspension of the production process. Such downtime in a production process is costly and undesirable. Further, filters may become clogged or tear and thus may require maintenance and result in downtime of a less predictable nature. Such tears may also result in an undesirable venting of particulate material into the manufacturing plant and/or the outside environment.

It is desirable to recycle the particulate material captured by the filters. Conventionally, this is done by cleaning the filters, to thereby collect the particulate material captured therein. The collected particulate material is then manually returned to a downstream point in the production process. The manual nature of cleaning the filters, collecting the captured particulate material and returning it to the production process can be relatively time consuming and labor intensive. Cleaning the filters and returning the captured material to the production process also requires suspension of the production process and, thus, even more downtime.

Therefore, what is needed in the art is a method and apparatus for removing fine particulate or powdered material from a flow of gas that reduces the need for manually cleaning of filters.

Furthermore, what is needed in the art is a method and apparatus for removing fine particulate or powdered material from a flow of gas that automates the filter cleaning process.

Still further, what is needed in the art is a method and apparatus for removing fine particulate or powdered material from a flow of gas that automates the process of recycling the material captured by the filter.

Yet further, what is needed in the art is a method and apparatus for removing fine particulate or powdered material from a flow of gas that reduces the downtime required for preventative and other maintenance.

Moreover, what is needed in the art is a method and apparatus for removing fine particulate or powdered material from a flow of gas that reduces the likelihood that particulate matter may be undesirably vented to the environment.

SUMMARY OF THE INVENTION

The present invention provides a method and apparatus for filtering fine particulate and/or powder material from a flow of gas, and which is automatically cleaned.

The invention comprises, in one form thereof, a gas-impermeable outer conduit having an open end and a closed end. The interior of the outer conduit is axially divided into first and second sides. A first clean and a first dirty flow path are defined within the first side. A first gas-permeable liner separates the first clean flow path from the first dirty flow path and from the open end. A second clean and a second dirty flow path are defined within the second side. A second gas-permeable liner separates the second clean flow path from the second dirty flow paths and from the open end. A control valve connects one of the first clean and second clean flow paths to an exhaust conduit, and connects the other clean flow path to a selectively pulsed supply of cleaning gas.

An advantage of the present invention is that the filters are cleaned automatically and without requiring suspension of the production process thereby avoiding downtime.

Another advantage of the present invention is that the material captured by the filters is automatically returned to the production process.

Yet another advantage of the present invention is a reduction in the likelihood that particulate matter will be vented to the environment.

BRIEF DESCRIPTION OF THE DRAWINGS

The above-mentioned and other features and advantages of this invention, and the manner of attaining them, will become apparent and be better understood by reference to the following description of one embodiment of the invention in conjunction with the accompanying drawings, wherein.

Corresponding reference characters indicate corresponding parts throughout the several views. The exemplifications set out herein illustrate one preferred embodiment of the invention, in one form, and such exemplifications are not to be construed as limiting the scope of the invention in any manner.

DETAILED DESCRIPTION OF THE DRAWINGS

Figure 1:
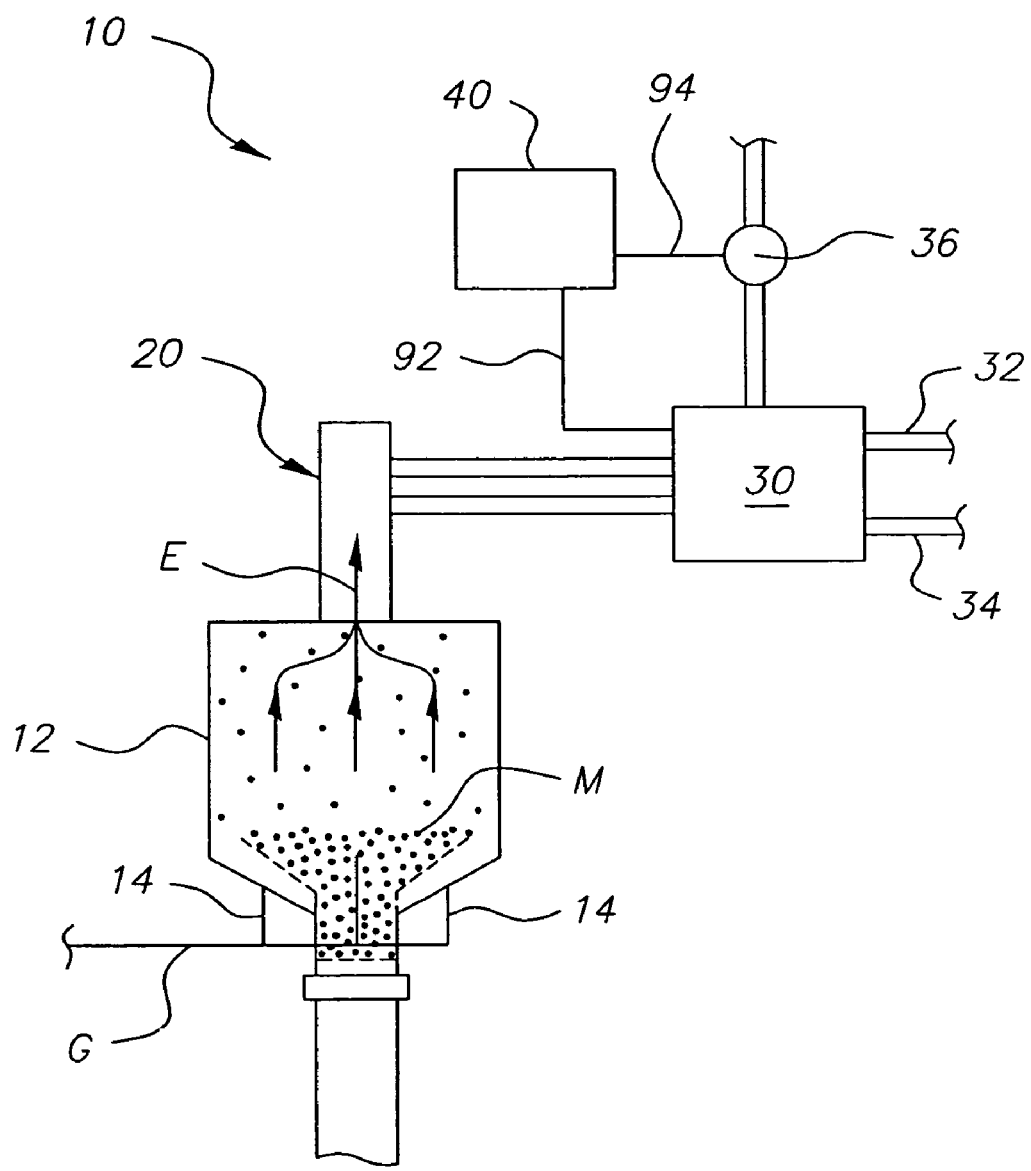
FIG. 1 is a schematic diagram of one embodiment of a filtering apparatus of the present invention.

Referring now to FIG. 1, one embodiment of a filtering apparatus with automatic cleaning of the present invention is schematically shown. Filter apparatus 10 is associated with one or more production process stations or vessels 12, such as, for example, a filler hopper, vibratory hopper, other type of hopper, jet mill, pulverizer, or virtually any other vessel or container used in producing fine particulate or powdered material.

As used herein, the term fine particulate or powdered material includes, for example, toner for use in electrophotographic printing and/or copying machines, carbon, silica, alumina, titanium dioxide, talc, plastic resins, pigments and other powdered materials that are classified or could be classified in groups A, B, and/or C of a Geldart Chart. For convenience, apparatus 10 is sometimes discussed hereinafter in connection with toner. However, it is to be understood that apparatus 10 is suitable for use with most fine powder materials as defined above.

Station or vessel 12 contains a quantity of fine particulate material M. A flow of pressurized process gas G, such as, for example, air, nitrogen or other suitable gas, is supplied via inlets 14 to vessel 12. The flow of pressurized process gas G serves one or more of a variety of purposes, including the control of dust within vessel 12, facilitating movement of the particulate material through vessel 12, and/or reducing entry of contaminants and foreign materials into vessel 12. Generally, filtering apparatus 10 provides a passageway for the venting or exhausting of the flow of pressurized process gas G from within vessel 12. The pressurized process gas G flows from vessel 12 in the form of a flow of exhaust gas E. The flow of exhaust gas E carries particles of the fine particulate material M.

Generally, filtering apparatus 10 filters or removes particulate material M from exhaust gas E, provides for automatic cleaning of the filter media, and automatically returns the particulate material M cleaned from the filter media to vessel 12. Filter apparatus 10 includes exhaust filter assembly 20, control or spool valve assembly 30, exhaust conduits 32 and 34, pulse valve 36, and controller 40.

Figure 2:
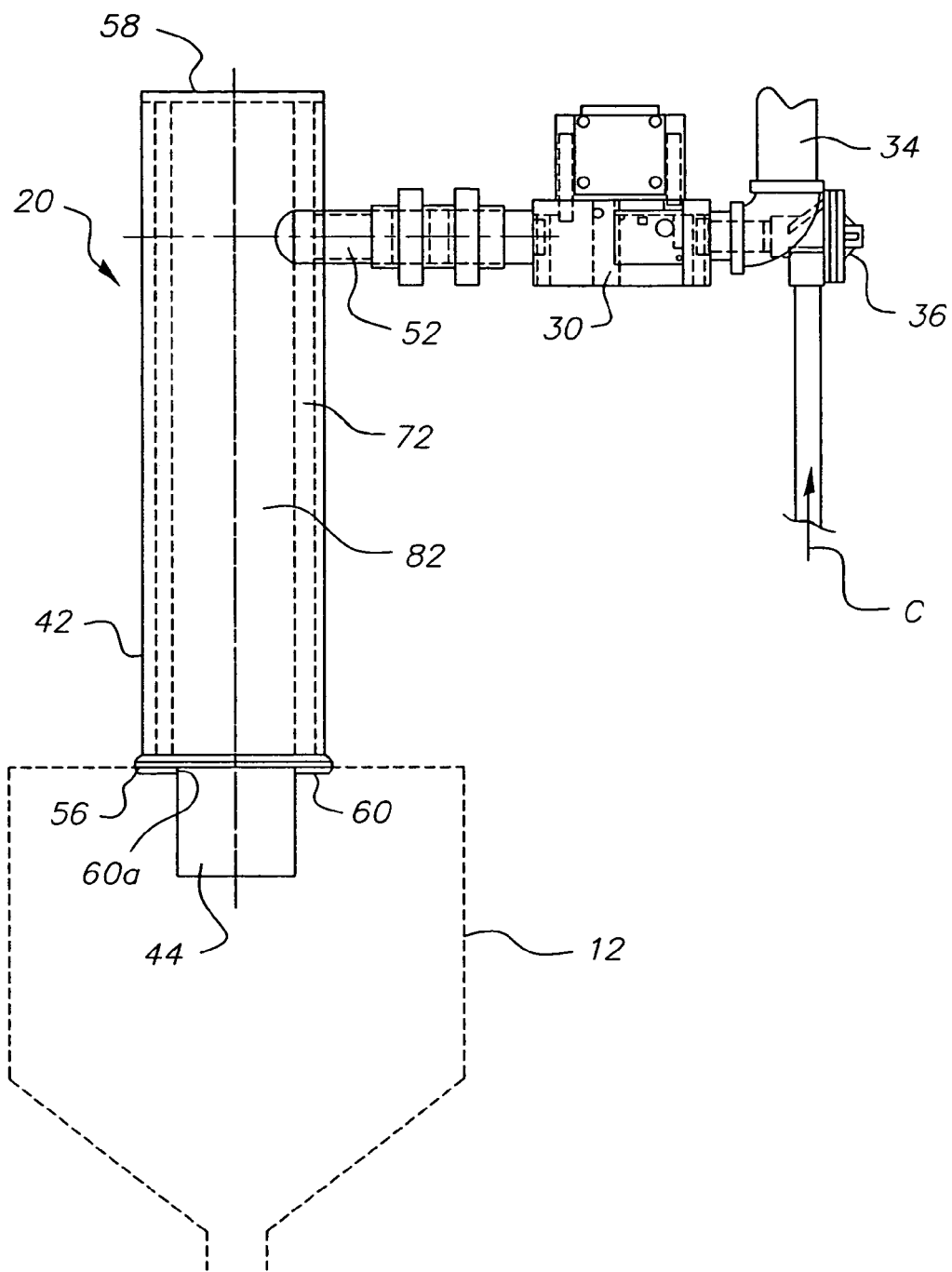
FIG. 2 is a side view of the filtering apparatus of FIG. 1.
Figure 3:
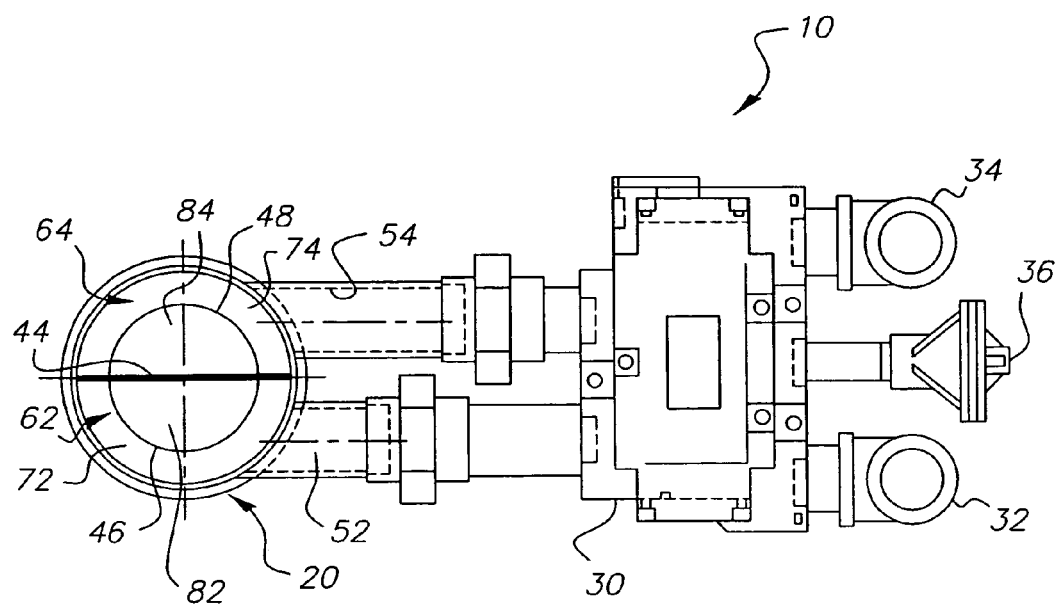
FIG. 3 is a top view of the filtering apparatus of FIG. 1.

Referring now to FIGS. 2 and 3, exhaust filter assembly 20 includes an outer conduit 42, central wall or divider 44, inner gas-permeable liners or filter media 46 and 48 (FIG. 3), and connecting conduits 52 and 54. Generally, outer conduit 42 is an elongate conduit having an open or inlet end 56 and a closed end 58. Open end 56 includes collar portion 60 that projects radially inward from the inner surface of outer conduit 42, and thereby defines an inlet orifice 60a at open end 56. Open end 56 is associated with vessel 12, such as, for example, disposed within and/or sealingly coupled thereto, such that the interior of outer conduit 42 is in fluid and/or gaseous communication with the interior of vessel 12. Outer conduit 42 is constructed of a material that is substantially impermeable to gas, such as, for example, aluminum, stainless steel or other gas impermeable material.

Central wall or divider 44 axially bisects the interior of outer conduit 42. More particularly, the outer edges (not referenced) of central divider 44 are sealingly affixed to or sealingly engaged with, such as, for example, by welding, respective and diametrically-opposed portions of the inner surface of outer conduit 42 and along the entire axial length thereof. Central divider 44 at a first end (not referenced) thereof is sealingly engaged with or affixed to collar 60, and at a second end (not referenced) thereof is sealingly engaged with or affixed to closed end 58 of outer conduit 42. Thus, central divider 44 bisects or axially divides the interior of outer conduit 42 into two halves or sides 62 and 64. Central divider 44 extends a predetermined distance from the inlet or open end 56 of outer conduit 42, and thus a portion of central divider 44 is disposed external to or outside of outer conduit 42. This portion of central divider 44 that extends from and is disposed external to outer conduit 42 is disposed within vessel 12 and, as will be more particularly described hereinafter, serves as a short-circuit baffle. Central divider 44 is, similarly to outer conduit 42, constructed of a gas impermeable material, such as, for example, aluminum, stainless steel or other gas impermeable material.

Inner gas-permeable linings or filter media 46 and 48 are generally C-shaped or semicircular in cross-sectional shape. The entire axial length of the outer edges (not referenced) of inner gas-permeable linings 46 and 48 are sealingly affixed to or engaged with respective and opposite sides of central divider 44. At one end, each of inner gas-permeable linings 46 and 48 are sealingly affixed to or engaged with closed end 58 of outer conduit 42. The opposite ends of each inner gas-permeable lining 46 and 48 are sealingly engaged with or affixed to respective portions of collar 60. The inner gas-permeable linings or filter media 46 and 48 are spaced apart from the inner surface of outer conduit 42. The inner gas-permeable linings or filter media 46 and 48 are constructed of a material that is permeable to gas but is impermeable to, and thus blocks, the passage of particulate material M, such as, for example, a fluidizing membrane for bulk handling of particulate material. Such fluidizing membranes are commercially available and may be constructed of, for example, a rolled laminate of several layers of fine stainless steel mesh or screen.

Generally, the above-described structure defines inner and outer flow paths on each side of central divider 44. As best shown in FIG. 3, first inner and outer flow paths are defined within first side 62 and first inner and first outer flow paths are defined within side 64 of outer conduit 42. More particularly, first outer/clean flow path 72 is defined between the inner surface of outer conduit 42, the outer surface of inner gas-permeable lining 46, and central divider 44. A second outer/clean flow path 74 is defined between the inner surface of outer conduit 42, the outer surface of inner gas-permeable lining 48, and central divider 44. A first inner/dirty flow path 82 is defined between central divider 44 and the inner surface of inner gas-permeable lining 46, and a second inner/dirty flow path 84 is defined between central divider 44 and the inner surface of inner gas-permeable lining 48.

Connecting conduits 52 and 54 are each sealingly affixed to and/or integral and monolithic with outer conduit 42, and are disposed generally proximate sealed or closed end 58 thereof. Connecting conduit 52 is disposed on one side of central divider 44 whereas connecting conduit 54 is disposed on the other or opposite side of central divider 44. More particularly, connecting conduit 52 is disposed on the same side of central divider 44 as first outer/clean flow path 72 and first inner flow path 82, and opens into first outer/clean flow path 72. Similarly, connecting conduit 54 is disposed on the same side of central divider 44 as second outer flow path 74 and second inner flow path 84, and opens into second outer/clean flow path 74.

Spool valve assembly 30 is configured as a three-way, five port, two-position spool valve, such as, for example, Model No. 148PA43AU manufactured by Numatics Incorporated of Highland, Mich. Connecting conduits 52 and 54, exhaust conduits 32 and 34, and pulse valve 36 are connected to the ports of valve assembly 30. The operation of valve assembly 30 is controlled by a spool valve control signal 92 (FIG. 1) issued by controller 40. As will be understood by one of ordinary skill in the art, spool valve control signal 92 controls either a solenoid of valve assembly 30 or the supply of air to an actuator of valve assembly 30 to thereby control the operation thereof. As is described more particularly hereinafter, spool valve assembly 30 selectively connects and disconnects exhaust conduits 32 and 34 with corresponding connecting conduits 52 and 54, and connects and disconnects connecting conduits 52 and 54 with pulse valve 36.

Exhaust conduits or ducting 32 and 34 are conduits constructed of material that is impermeable to gas, such as, for example, stainless steel or aluminum. Exhaust gas conduits connect spool valve assembly 30 and the vented or exhaust gas carried thereby to a downstream process, such as, for example, a gas recycling process.

Pulse valve 36, as described above, is connected to one of the ports of valve assembly 30. Pulse valve 36 is configured as a diaphragm or poppet valve, such as, for example, Model No. 8353C033, manufactured by the ASCO company of Florham Park, N.J. Pulse valve 36 selectively connects or pulses one of connecting conduits 52 and 54 with a supply of pressurized cleaning gas C. Cleaning gas C may be the same type of gas as the flow of pressurized process gas G supplied to vessel 12, and may be at the same or a different pressure as the flow of pressurized process gas G, or may be a different type of gas. The particular type of gas and pressures used will be dependent primarily upon the particular process parameters and properties or characteristics of particulate material M. The operation of pulse valve 36 is controlled by a pulse valve control signal 94 (FIG. 1) issued by controller 40.

Controller 40, controls the operation of valve assembly 30 and, thereby, filter apparatus 10. Controller 40, such as, for example, a programmable logic controller or microprocessor, issues a spool valve control signal 92 to valve assembly 30 and issues a pulse valve control signal 94 to pulse valve 36.

In use, filtering apparatus 10 filters or removes particulate material M from the flow of exhaust gas E, provides for automatic cleaning of the gas-permeable liners or filter media 46 and 48, and automatically returns the particulate material M cleaned from the gas-permeable liners or filter media 46 and 48 to vessel 12.

More particularly, vessel 12 contains a quantity of fine particulate material M, and is supplied with a flow of pressurized process gas G, such as, for example, air, nitrogen or other suitable gas, via inlet 14. The flow of pressurized process gas G serves one or more of a variety of purposes, including the control of dust within vessel 12, facilitating movement of the particulate material through vessel 12, and/or reducing entry of contaminants and foreign materials into vessel 12. The pressurized process gas G flows out vessel 12 and through filter apparatus 10 in the form of a flow of exhaust gas E. The flow of exhaust gas E carries particles of the fine particulate material M.

Valve assembly 30, dependent at least in part upon a spool valve control signal 92 from controller 40, connects one of connecting conduits 52 and 54 with a corresponding one of exhaust conduits 32 and 34. Thus, valve assembly 30 is switchable between a first position and a second position.

Figure 4:
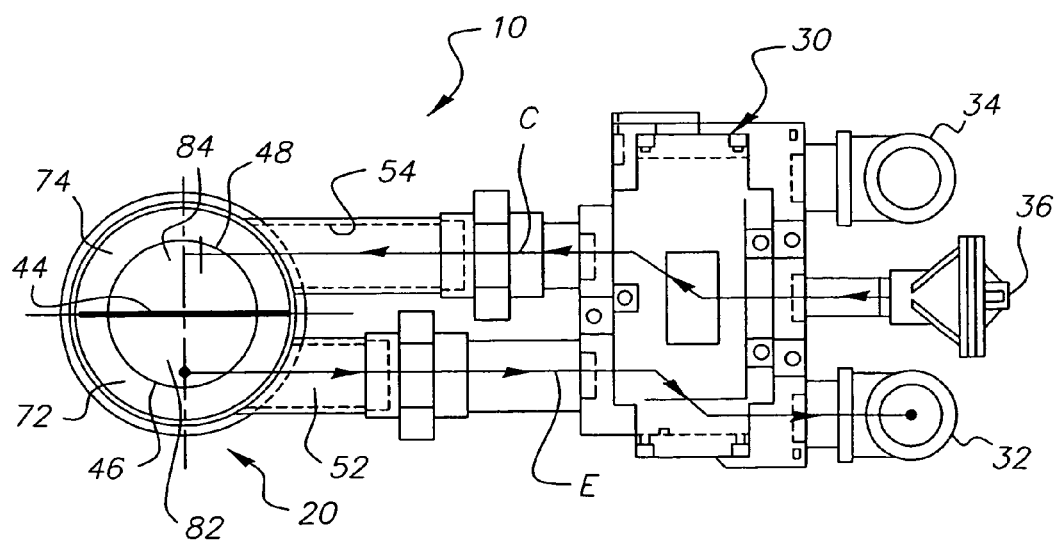
FIG. 4 illustrates the flow of exhaust and cleaning gases through the filtering apparatus of FIG. 1 during a first mode of operation.

In the first position, as best shown in FIG. 4, valve assembly 30 connects first outer/clean flow path 72, first inner flow path 82 and connecting conduit 52 with exhaust conduit 32, and disconnects second outer flow path 74, second inner flow path 84 and connecting conduit 54 from exhaust conduit 34. Exhaust gas E flows through inlet orifice 60a into first inner flow path 82, through inner gas-permeable lining or filter media 46 and into first outer/clean flow path 72, into connecting conduit 52, and out exhaust conduit 32. The particulate material M carried by exhaust gas E is trapped by or within inner gas-permeable lining or filter media 46. With valve assembly 30 in the first position, first inner flow path 82, inner gas-permeable lining or filter media 46, connecting conduit 52 and exhaust conduit 32 collectively form the "exhaust side" of exhaust filter assembly 20.

Figure 5:
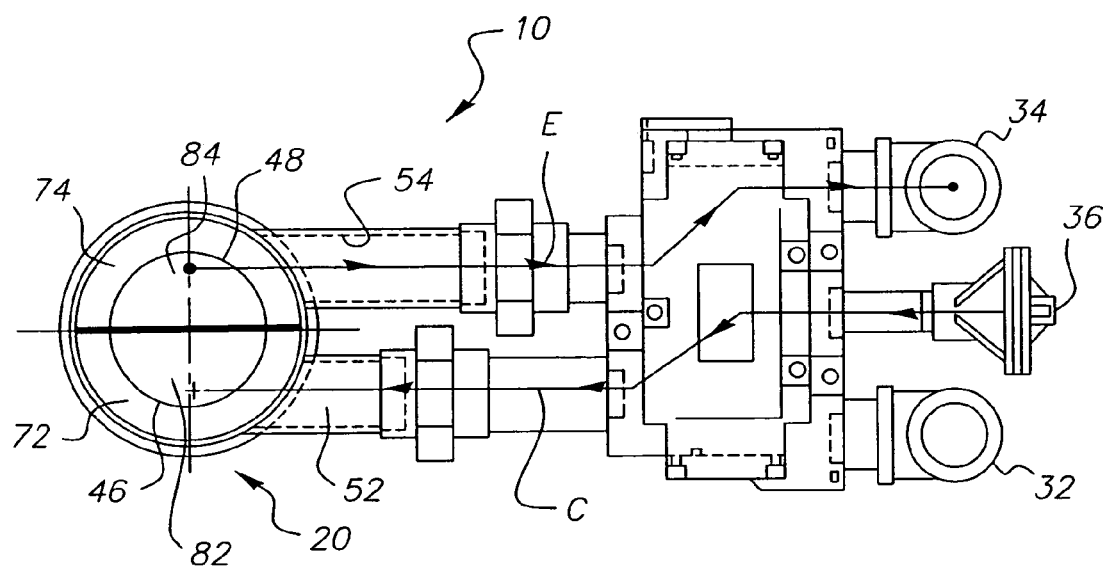
FIG. 5 illustrates the flow of exhaust and cleaning gases through the filtering apparatus of FIG. 1 during a second mode of operation.

In the second position, as best shown in FIG. 5, valve assembly 30 connects second outer flow path 74, second inner flow path 84 and connecting conduit 54 with exhaust conduit 34, and disconnects first outer/clean flow path 72, first inner flow path 82 and connecting conduit 52 from exhaust conduit 32. Exhaust gas E flows into second inner flow path 84, through inner gas-permeable lining or filter media 48 and into second outer flow path 74, into connecting conduit 54, and out exhaust conduit 34. The particulate material M carried by exhaust gas E is trapped by or within inner gas-permeable lining or filter media 48. With valve assembly 30 in the second position, second inner flow path 84, inner gas-permeable lining or filter media 48, second outer flow path 74, connecting conduit 54 and exhaust conduit 34 collectively form the "exhaust side" of exhaust filter assembly 20.

Filter media 46 and 48 remove and/or trap therein, particulate material M carried by exhaust gas E. The filtered exhaust gas E flowing through exhaust conduits 32 and 34 carry significantly less particulate material M. Thus, the rate at which particulate material M accumulates within exhaust ducting or conduits 32 and 34, and all other downstream ducting, is significantly reduced. Exhaust conduits 32 and 34, therefore, require less frequent scrubbing or cleaning.

It should be particularly noted that exhaust gas E must pass through the inner gas-permeable lining or filter media 46 or 48 corresponding to the "exhaust side" of exhaust filter assembly 20 in order to enter the corresponding first or second outer/clean flow paths 72 and 74. This is due to the sealing engagement of each of the inner gas-permeable linings 46 and 48 to collar 60 at one end and to closed end 58 at the other end. Since exhaust gas E must pass through the inner gas-permeable linings 46 or 48 before entering the corresponding first or second outer/clean flow paths 72 and 74, the exhaust gas E flowing within outer/clean flow paths 72 and 74 contain relatively small amounts, if any, of particulate material M. Therefore, the exhaust gas E within first or second outer/clean flow paths 72 or 74 is "clean" or has been filtered, and first or second outer flow paths 72 or 74 are thus referred to as the "clean" or "filtered" flow paths.

Depending upon whether valve assembly 30 is in the first or second position, the flow of cleaning gas C will impinge upon and pass through one of inner gas-permeable linings or filter media 46 and 48 thereby cleaning the filter media and returning particulate material M to vessel 12.

More particularly, with valve assembly 30 in the first position (FIG. 4), first inner flow path 82, inner gas-permeable lining or filter media 46, connecting conduit 52 and exhaust conduit 32 collectively form the "exhaust side" of exhaust filter assembly 20. No exhaust gas is flowing through the opposite side of filter apparatus 10, i.e., the side of outer conduit 42 that includes second outer flow path 74 and second inner flow path 84. Rather, with valve assembly 30 in the first position second outer flow path 74 and second inner flow path 84 are connected via connecting conduit 54 to pulse valve 36. Responsive at least in part to pulse valve control signal 94, pulse valve 36 is operated (i.e., pulsed opened and/or closed) to direct one or more pulses of cleaning gas C through connecting conduit 54, into second outer flow path 74, through inner gas-permeable lining or filter media 46, and into second inner flow path 84. The pulses of cleaning gas C impinges upon and passes through inner gas-permeable lining or filter media 46 and thereby removes or dislodges any particulate material M that has been trapped therein.

Thus, activating pulse valve 36 with valve assembly 30 in the first position cleans accumulated or trapped particulate material M from inner gas-permeable lining or filter media 48. Therefore, the side of filter apparatus 10 that includes inner gas-permeable lining or filter media 48 is referred to as the "cleaning side" when valve assembly 30 in the first position.

Similarly, with valve assembly 30 in the second position (FIG. 5) first outer/clean flow path 72, and first inner flow path 74, are connected via connecting conduit 52 to pulse valve 36. Responsive at least in part to pulse valve control signal 94, pulse valve 36 is operated to direct one or more pulses of cleaning gas C through connecting conduit 52 and into first outer/clean flow path 72 and first inner flow path 74. The pulses of cleaning gas C impinges upon and passes through inner gas-permeable lining or filter media 48 and thereby removes or dislodges any particulate material M that has been trapped therein. Thus, activating pulse valve 36 with valve assembly 30 in the second position cleans accumulated or trapped particulate material M from inner gas-permeable lining or filter media 46. Therefore, the side of filter apparatus 10 that includes inner gas-permeable lining or filter media 46 is referred to as the "cleaning side" when valve assembly 30 in the second position.

As noted, the pulse of cleaning gas C impinging upon and passing through the "cleaning side" filter media 46 or 48 dislodges any particulate material M that has been trapped therein. The dislodged particulate material M falls or is carried through the first or second inner flow paths 82 and 84, respectively, that corresponds to the "cleaning side" of the filter apparatus 10. The particulate material M is thereby automatically returned to the interior of vessel 12. Thus, the need to manually clean the filter media, collect the particulate material M, and return the particulate material M to a downstream point in the production process is automated. Further, since one side of exhaust filter assembly 20 acts as the "exhaust side" while the other "cleaning side" thereof is cleaned, there is no longer a need to suspend the production process in order to clean the filter media, collect the particulate material M, and return the particulate material M to a downstream point in the production process.

The portion of central divider 44 that extends through open end 56 of outer conduit 42 and into vessel 12 reduces the likelihood that the particulate material M, dislodged from the gas-permeable filter media 46 or 48 and which falls back into vessel 12 through the "cleaning side" of exhaust filter assembly 20, will be picked up by and/or enter the flow of exhaust gas E flowing from vessel 12 through the "exhaust side" of outer conduit 42. Thus, that portion of central divider 44 that extends from within outer conduit 42 and into vessel 12 acts as a short-circuit baffle.

Figure 6:
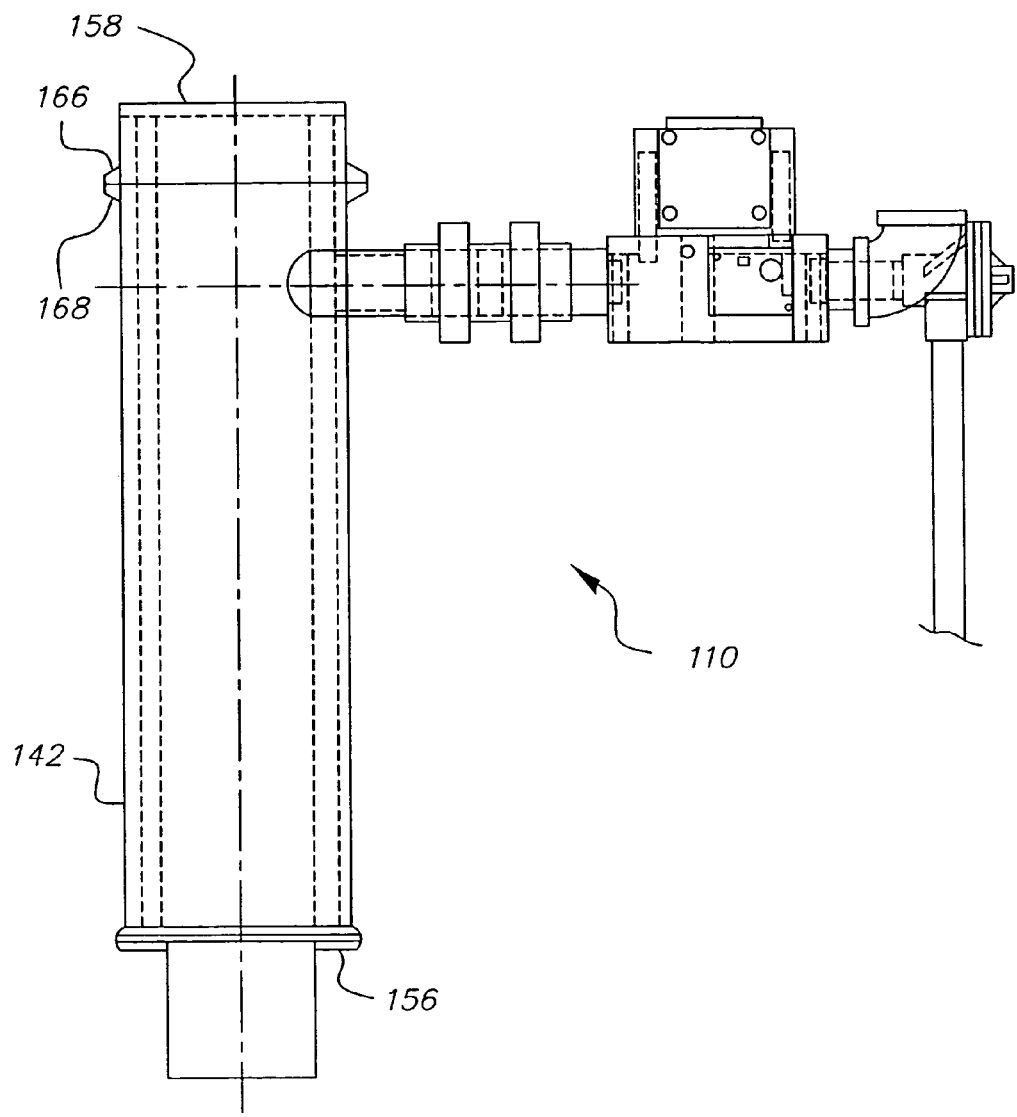
FIG. 6 is a side view of a second embodiment of the filtering apparatus of the present invention.

Referring now to FIG. 6, an alternate embodiment of the filter apparatus of the present invention is shown. Filter apparatus 110 is generally similar to filter apparatus 10, and thus only the distinctions of filter apparatus 110 are discussed hereinafter.

Filter apparatus 110 includes a two-part or two-piece outer conduit 142. More particularly, outer conduit 142 includes a bottom open-end portion 156 and a top closed-end portion 158. Each of bottom open-end portion 156 and a top closed-end portion 158 include respective flanges 166 and 168. The bottom open-end portion 156 and the top closed-end portion 158 are coupled together by mating flanges 166 and 168 together with fasteners, such as, for example, bolts or other suitable fasteners, to thereby form a complete outer conduit 142. The mating flanges 166 and 168 enable outer conduit 142 to be disassembled, and top closed-end portion 158 and bottom open-end portion 156 to be removed from each other thereby facilitating maintenance and cleaning of the interior of outer conduit 142.

In the preferred embodiment shown, outer conduit 42 is shown as having a circular cross-section and inner gas-permeable liners 46 and 48 are shown as being C-shaped. However, it is to be understood that outer conduit 42 can be alternately configured, such as, for example, with a square, oval or other cross-sectional geometry, and that inner gas-permeable liners 46 and 48 can also be similarly and alternately configured to form suitable inner and outer flow paths.

In the embodiment shown, filter assembly 20 is disclosed has having a central wall or divider 44 that is attached to diametrically opposed points along the length of the interior surface of outer conduit 42. However, it is to be understood that filter assembly 20 can be alternately configured with a central wall or divider that, for example, is affixed to non-diametrically opposed sides of the interior surface of outer conduit 42.

While this invention has been described as having a preferred embodiment, the present invention can be further modified within the spirit and scope of this disclosure. This application is therefore intended to cover any variations, uses, or adaptations of the present invention using the general principles disclosed herein. Further, this application is intended to cover such departures from the present disclosure as come within the known or customary practice in the art to which this invention pertains and which fall within the limits of the appended claims.

PARTS LIST

10 Filter Apparatus
12 Vessel
14 Inlet
20 Exhaust Filter Assembly
30 Spool Valve Assembly
32 Exhaust Conduit
34 Exhaust Conduit
36 Pulse Valve
40 Controller
42 Outer Conduit
44 Central Divider
46 Inner Gas-Perm. Liner/Filter Media
48 Inner Gas-Perm. Liner/Filter Media
52 Connecting Conduit
54 Connecting Conduit
56 Open/Inlet End 58 Closed End
60 Collar Portion
62 First Side of Outer Conduit
64 Second Side of Outer Conduit
72 First Outer Flow Path
74 Second Outer Flow Path
78 Second Inner Flow Path
82 First Inner Flow Path
84 Second Inner Flow Path
92 Spool Valve Control Signal
94 Pulse Valve Control Signal
142 Outer Conduit
158 Closed End
160 Open End
166 Flange
168 Flange
M Particulate Material
G Process Gas
E Exhaust Gas

The invention claimed is:

1. A filter apparatus with automatic cleaning for removing fine particulate material from a flow of exhaust gas, said filter apparatus comprising:
   a gas-impermeable outer conduit having an open end and a closed end, said open end configured for receiving the flow of exhaust gas, an interior of said outer conduit being axially divided into a first side and a second side;
   a first clean flow path and a first dirty flow path defined within said first side of said outer conduit;
   a first gas-permeable inner liner separating said first clean flow path and said first dirty flow path, and separating said first clean flow path from said open end;
   a second clean flow path and a second dirty flow path defined within said second side of said outer conduit;
   a second gas-permeable inner liner separating said second clean flow path and said second dirty flow path, and separating said second clean flow path from said open end; and
   a control valve assembly connecting one of said first clean flow path and said second clean flow path to a corresponding exhaust conduit, and connecting the other of said first clean flow path and second clean flow path to a selectively pulsed supply of cleaning gas.

2. The filter apparatus of claim 1, wherein said outer conduit includes a central divider axially dividing said interior of said outer conduit into said a first side and a second side.

3. The filter apparatus of claim 2, wherein said central divider axially extends a predetermined distance from said open end of said outer conduit and is configured for being disposed within a vessel.

4. The filter apparatus of claim 3, wherein said first dirty flow path is conjunctively defined at least in part by said first gas-permeable inner liner and a first side of said divider.

5. The filter apparatus of claim 4, wherein said second dirty flow path is conjunctively defined at least in part by said second gas-permeable inner liner and a second side of said divider.

6. The filter apparatus of claim 4, wherein said first clean flow path is conjunctively defined at least in part by said first gas-permeable inner liner and an inside surface of said first side of said outer conduit.

7. The filter apparatus of claim 4, wherein said second clean flow path is conjunctively defined at least in part by said second gas-permeable inner liner and an inside surface of said second side of said outer conduit.

8. The filter apparatus of claim 4, further comprising:
   a gas-impermeable collar surrounding said open end of said outer conduit and extending a predetermined distance radially inwardly therefrom; and
   an inlet orifice defined by said collar.

9. The filter apparatus of claim 8, wherein:
   said first clean flow path is conjunctively defined at least in part by said first gas-permeable inner liner, said collar and said closed end;
   said second clean flow path is conjunctively defined at least in part by said second gas-permeable inner liner, said collar and said closed end;
   said first dirty flow path is conjunctively defined at least in part by said inlet orifice, said first gas-permeable inner liner and said divider; and
   said second dirty flow path is conjunctively defined at least in part by said inlet orifice, said second gas-permeable inner liner and said divider.

10. The filter apparatus of claim 1, wherein said control valve assembly includes a control valve having a first port connected to said first clean flow path, a second port connected to said second clean flow path, a third port and a fourth port connected to respective exhaust conduits, and a fifth port connected to a pulsed source of cleaning gas.

11. The filter apparatus of claim 10, further comprising a pulse valve, said pulse valve selectively connecting and disconnecting a source of cleaning gas to said fifth port.

12. The filter apparatus of claim 11, further comprising a controller, said controller issuing a control valve control signal to said control valve and a pulse valve control signal to said pulse valve, said control valve dependent at least in part upon said control valve control signal connecting one of said first clean and said second clean flow paths to a corresponding exhaust conduit and connecting the other of said first clean and second clean flow paths to said pulse valve, said pulse valve dependent at least in part upon said pulse valve control signal pulsingly connecting said source of cleaning gas to said control valve.

13. An apparatus used for producing or processing fine particulate material, comprising:
   a process vessel within which the fine particulate material is disposed, said vessel being supplied with a flow of process gas, said flow of process gas exiting said vessel as a flow of exhaust gas, said flow of exhaust gas carrying particulate material;
   a gas-impermeable outer conduit having an open end and a closed end, said open end receiving the flow of exhaust gas, an interior of said outer conduit being axially divided into first and second sides;
   first inner and first outer flow paths defined within said first side of said outer conduit;
   a first gas-permeable inner liner separating said first inner and first outer flow paths, and separating said first outer flow path from said open end;
   second inner and second outer flow paths defined within said second side of said outer conduit;
   a second gas-permeable inner liner separating said second inner and outer flow paths, and separating said second outer flow path from said open end; and
   a control valve assembly connecting one of said first and second outer flow paths to a corresponding exhaust conduit, and connecting the other of said first and second outer flow paths to a selectively pulsed supply of cleaning gas.

14. The apparatus of claim 13, wherein said outer conduit includes a central divider axially dividing said interior of said outer conduit into said first and second sides.

15. The apparatus of claim 14, wherein said central divider axially extends a predetermined distance from said open end of said outer conduit and into said vessel.

16. The filter apparatus of claim 15, wherein said first inner flow path is conjunctively defined at least in part by said first gas-permeable inner liner and a first side of said divider.

17. The filter apparatus of claim 15, wherein said second inner flow path is conjunctively defined at least in part by said second gas-permeable inner liner and a second side of said divider.

18. The filter apparatus of claim 15, wherein said first outer flow path is conjunctively defined at least in part by said first gas-permeable inner liner and an inside surface of said first side of said outer conduit.

19. The filter apparatus of claim 15, wherein said second outer flow path is conjunctively defined at least in part by said second gas-permeable inner liner and an inside surface of said second side of said outer conduit.

* * * * *